L. H. WILKINSON.
PERCOLATING DEVICE.
APPLICATION FILED SEPT. 23, 1912.
1,067,206.
Patented July 8, 1913.
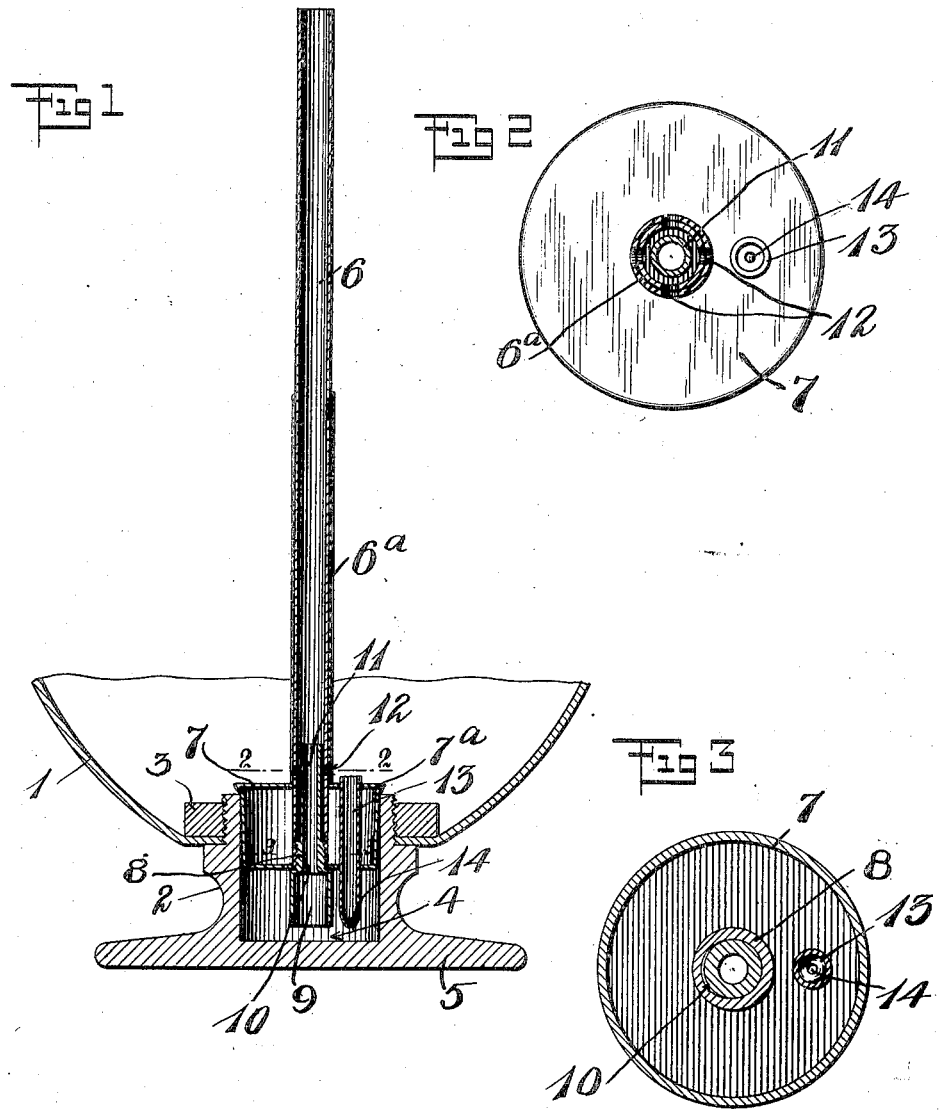
WITNESSES
INVENTOR
L. H. Wilkinson
BY
ATTORNEYS

UNITED STATES PATENT OFFICE.

LOUIS HOWARD WILKINSON, OF MERIDEN, CONNECTICUT, ASSIGNOR TO MANNING, BOWMAN & COMPANY, OF MERIDEN, CONNECTICUT, A CORPORATION OF CONNECTICUT.

PERCOLATING DEVICE.

1,067,206.            Specification of Letters Patent.          Patented July 8, 1913.

Application filed September 23, 1912. Serial No. 721,769.

*To all whom it may concern:*

Be it known that I, LOUIS H. WILKINSON, a citizen of the United States, residing at Meriden, New Haven county, and State of Connecticut, have invented certain new and useful Improvements in Percolating Devices, of which the following is a full, clear, and exact description.

This invention relates to improvements in percolator pots and is more particularly concerned with a construction of the percolating tube, whereby a pure and non-injurious infusion of coffee is obtained and whereby a more complete circulation of the liquid is secured. In addition, the structure is designed to start the percolating action in a minimum of time and is designed to combine simplicity of structure with efficiency in the attainment of the objects recited. These and other advantages will be apparent from the more detailed description following, taken in connection with the accompanying drawing forming part thereof, and illustrating a preferable embodiment of the invention.

In these drawings: Figure 1 is a fragmentary sectional view illustrating as much of a percolator pot and its heating chamber and tube as necessary to disclose a preferable embodiment of my invention. Fig. 2 is a horizontal sectional view taken on the line 2—2 of Fig. 1. Fig. 3, is a horizontal sectional view taken on the line 3—3 of Fig. 1.

Referring to the drawings by numerals, 1 indicates a portion of the bottom of a percolator pot to which a heating base 2 is secured by means of a nut 3. The heating base is provided with a heating chamber 4 preferably of uniform diameter and designed to receive and heat liquid fed from the body of the pot. The heating base 2 has an enlargement or disk 5 at its lower end to increase the heated surface, the heat from said disk being conducted directly to the heating chamber 4. The percolating tube 6 is preferably made thicker adjacent its lower end, as by a sleeve 6ª sweated thereon to strengthen the same, and is provided at such lower end with an enlargement 7 in the form of a hollow tube or plug. The percolating tube 6 extends centrally through said hollow enlargement, its walls forming a tight joint with said enlargement and the lower end of the tube being interiorly threaded as at 8. The side walls of this enlargement are preferably somewhat cone shaped to fit snugly within the heating chamber and to be removable therefrom, the upper end of the enlargement being provided with a beveled edge 7ª which acts to hold the upper face of the enlargement above the bottom of the surrounding pot body. The lower threaded end 8 of the percolator tube 6 preferably terminates flush with the under face of the enlargement 7. An injector tube is provided, having its enlarged lower end 9 extending down into and adjacent the bottom of the heating chamber and reduced in diameter to form a threaded intermediate portion 10, adapted to engage with the threaded lower end of the percolator tube, the injector tube being further reduced in diameter from this point upwardly and extending upward within the percolator tube 6 to form an injecting nozzle 11, the diameter of this upper portion of the injector tube being less than the internal diameter of the percolator tube 6, thereby providing a space between these two tubes. The injector tube extends up within the percolator tube to a point above the top of the enlargement 7. Percolator tube 6 at a point above the top of the enlargement 7 and below the top of the injecting nozzle 11 is provided with one or more injecting apertures 12. Extending down through the hollow enlargement 7 of the percolator tube and with its upper end above the top of said enlargement, is a feed tube 13 with its lower end contracted at 14 to provide a restricted feed opening. This tube likewise has a snug fit with the adjacent edges of the enlargement 7, so that said enlargement is air tight and acts to insulate the liquid in the body of the pot from that in the heating chamber 4.

From the foregoing construction, it will be seen that the operation of my improved form of percolator device is as follows: The liquid contained in the pot body, feeds by gravity through the feed tube 13 and through its restricted outlet aperture 14 into the heating chamber 4. Here it is quickly raised to the temperature necessary for the percolating operation, so that the heated liquid rises rapidly up through the injector tube and through the percolating tube to its top, where it is distributed over the coffee grains, for example, in the usual manner.

The heated liquid rising through injecting tube 6 operates as a hydraulic injector and draws in through the aperture or apertures 12 liquid from the main body of the pot. This not only produces a better circulation of the liquid, but serves to reduce the temperature of the hotter water to a point where it will extract only the pure coffee essence from the grains. Coffee as is well known, contains injurious ingredients which are extracted therefrom when water at a very high temperature is poured therethrough. By tempering the very hot liquid coming from the heating chamber 4 with cooler liquid from the pot body, I am enabled to secure a pure coffee infusion, for example, without extracting from the grain and combining with said infusion the harmful ingredients of the grain. Furthermore the liquid drawn in from the pot body through the injecting apertures in the percolator tube, serves to reduce the force of the jets or puffs of steam which, at times, are forced up the percolator tube from the heating chamber. The pressure of the upwardly rising column of water during the percolating operation will prevent any of the water in the pot body from flowing down into the heating chamber through the injector tube.

By providing the feed tube 13 with a restricted feed opening, the liquid is fed from the pot body into the heating chamber comparatively slowly, so that said chamber is kept continuously supplied with a comparatively small quantity of liquid which is quickly raised to percolating temperature and is forced upwardly through the percolator tube. The gravity feed of the liquid from the pot body to the interior of the heating chamber is aided by the suction caused by the ebullition of boiling water at the lower end of the inlet tube. By having the top of said tube and the injecting apertures 12 above the bottom of the pot body, clogging from grains is prevented.

I have described herein a preferable embodiment of my invention, but desire it understood that the details of structure thereof may be modified within the spirit of the invention and the scope of the appended claims.

What I claim therefore, and desire to secure by Letters Patent is:

1. In a device of the character described, the combination of a main chamber, a heating chamber at the base thereof; a percolating tube having an injecting aperture therein communicating with said main chamber at a point above said heating chamber, an injector tube communicating with said heating chamber and connected to said percolating tube and extending upwardly therewithin to a point adjacent said injecting aperture, and means for feeding liquid from said main chamber to said heating chamber.

2. In a device of the character described, the combination of a main chamber; a heating chamber at the base thereof; a percolating tube having an injecting aperture therein and provided with an enlargement at its lower end adapted to be seated within said heating chamber; an injector tube communicating with said heating chamber and with the interior of said percolating tube; and means for feeding liquid through said enlargement from said main chamber to said heating chamber.

3. In a device of the character described, the combination of a main chamber, a heating chamber at the base thereof; a percolating tube having an injecting aperture therein and provided with a hollow enlargement at its lower end adapted to be seated within said heating chamber; an injector tube extending up within said percolator tube and spaced from the walls thereof, the lower end of said injector tube extending into said heating chamber; and a feed tube extending through said enlargement and in communication with said main and heating chambers.

4. In a device of the character described, the combination of a main chamber, a heating chamber at the base thereof; a percolator tube having an injecting aperture therein and provided with a hollow enlargement at its lower end adapted to be seated within said heating chamber; an injector tube connected to the lower end of said percolator tube and extending up within the same and spaced from the walls thereof, the lower end of said injector tube extending down into said heating chamber; and a feed tube extending through said enlargement and communicating with said main and heating chambers.

5. In a device of the character described, the combination of a main chamber; a heating chamber at the base thereof; a percolating tube having an injecting aperture therein and provided with a hollow enlargement at its lower end, said percolator tube extending through said enlargement and having its lower end open and threaded; an injector tube threaded to engage with the lower end of said percolating tube, said injector tube having its upper end extending up within the percolator tube to a point above the injecting aperture therein, and being spaced from the walls of said tube, and having its lower end extending into said heating chamber; and a tube extending through said hollow enlargement and communicating with said main and heating chambers, one end of said tube being formed with a restricted opening.

6. In a device of the character described, the combination of a main chamber; a heating chamber at the base thereof; a percolating tube having an injecting aperture therein and provided with an enlargement at its lower end adapted to be seated within said heating chamber; an injector tube communicating with said heating chamber and with the interior of said percolating tube; and a feed tube extending through said enlargement and communicating with said main and heating chambers, one end of said tube being contracted to form a restricted feed opening therethrough.

7. In a device of the character described, the combination of a main chamber; a heating chamber at the base thereof; a percolator tube communicating with said heating chamber and having an injecting aperture therein in communication with said main chamber at a point above said heating chamber; and means independent of said tube for feeding liquid from said main chamber to said heating chamber.

8. In a device of the character described, the combination of a main chamber; a heating chamber at the base thereof; a percolator tube communicating with said heating chamber and having an injecting aperture therein communicating with said main chamber at a point above said heating chamber; and an independent tube connecting said main and heating chambers and adapted to feed liquid from said main to said heating chamber.

LOUIS HOWARD WILKINSON.

Witnesses:
GEORGE E. SAVAGE,
A. LE ROY HUBBARD.